United States Patent
Bruns

[11] 3,830,113
[45] Aug. 20, 1974

[54] TRANSMISSION BELT STRUCTURE
[75] Inventor: James A. Bruns, Eagle, Nebr.
[73] Assignee: The Goodyear Tire & Rubber Company, Akron, Ohio
[22] Filed: Dec. 29, 1972
[21] Appl. No.: 319,253

[52] U.S. Cl. .................................. 74/231, 74/233
[51] Int. Cl. ........................................... F16g 1/00
[58] Field of Search .......... 74/231 R, 231 P, 231 C, 74/231 J, 233, 237; 156/137, 138, 139, 140

[56] References Cited
UNITED STATES PATENTS

| | | | |
|---|---|---|---|
| 941,786 | 11/1909 | Kolbe | 74/233 |
| 1,890,080 | 12/1932 | Freedlander | 74/233 |
| 2,831,359 | 4/1958 | Carle | 74/231 C |
| 2,894,405 | 7/1959 | Carle | 74/231 C |
| 3,068,710 | 12/1962 | Beckadolph | 74/237 |

Primary Examiner—Charles J. Myhre
Assistant Examiner—R. H. Lazarus
Attorney, Agent, or Firm—F. W. Brunner; R. P. Yaist

[57] ABSTRACT

A trapezoidal shaped power transmission belt of high longitudinal flexibility having a tension section, a compression section of less thickness than the tension section and a neutral axis section between the tension and compression sections. When the belt operates in grooved pulleys the greatest proportion of the driving contact is provided by the tension section rather than by the compression section. The pitch line of the belt is disposed below the transverse centerplane of the belt and the tension section includes a plurality of relatively deep transverse grooves or notches to increase the belt's flexibility. The belts are particularly useful in compact variable speed drives equipped with relatively small diameter pulleys.

18 Claims, 6 Drawing Figures

PATENTED AUG 20 1974  3,830,113
SHEET 1 OF 2
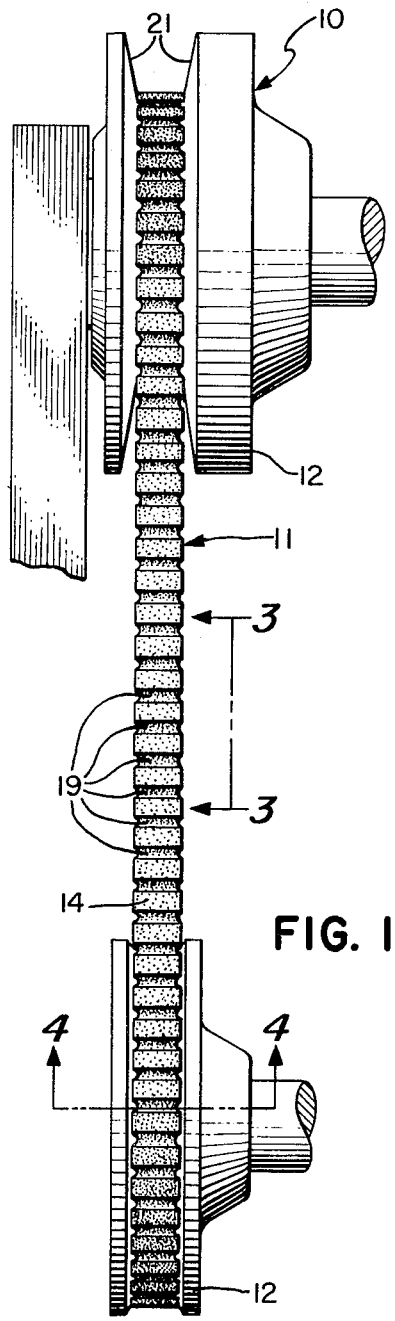
FIG. I
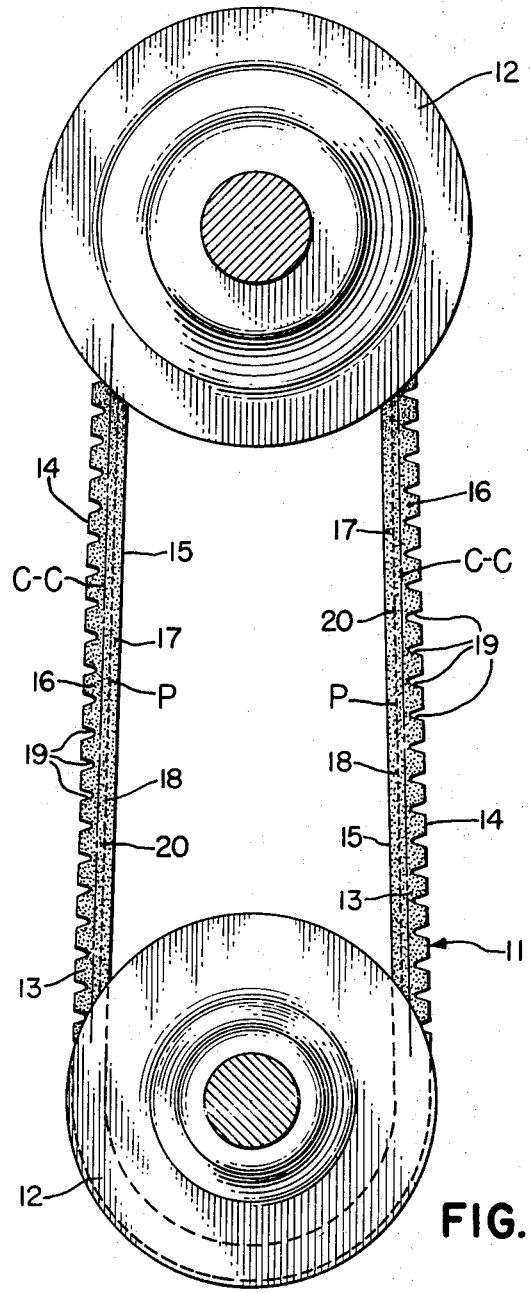
FIG. 2
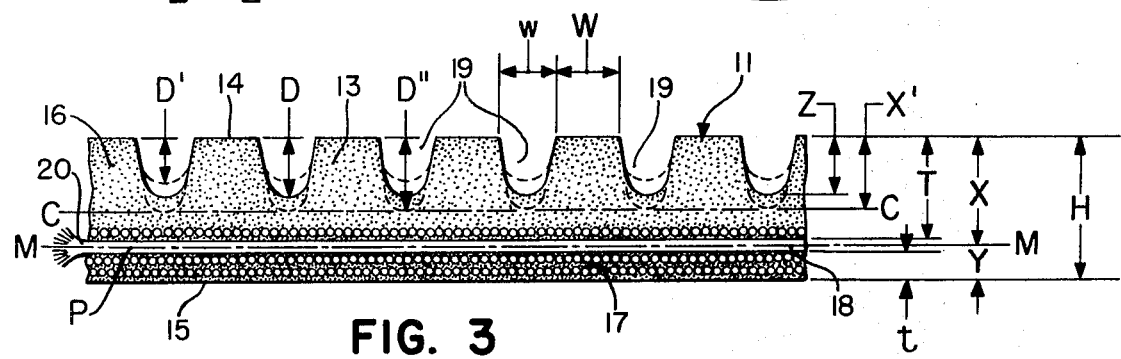
FIG. 3

TRANSMISSION BELT STRUCTURE

BACKGROUND OF THE INVENTION

This invention relates to transmission belts and more particularly, to transmission belts of the V-type having high flexibility which are particularly useful on compact variable speed V-belt drives. This invention has specific application to a novel belt structure for a V-belt to improve its service life and operability when used in conjunction with small diameter sheaves or pulleys in such drives.

V-belts for both conventional and variable speed drives have a body of a customary trapezoidal cross-sectional configuration with a top surface or major base and a more narrow bottom surface or minor base. The body is usually formed of reinforced flexible resilient material which, for example, is a flexible polymeric material such as natural or synthetic rubber. A tension section is disposed adjacent to the major base and a thicker compression section is disposed adjacent to the minor base of the belt. A neutral axis section comprised of at least one tension stress-resisting member extending longitudinally of the belt is disposed between the tension and compression sections. The stress-resisting members are typically formed of an essentially inextensible material such as textile cord fabric.

These cords or tension members are normally positioned at or near the major base and commonly within the upper one-third of the belt, for example, at a distance of from about ¾ to about ⅔ of the way from the bottom or minor base of the belt. In some belt structures, the tension member may be located as low as the longitudinal centerplane of the belt section but rarely if ever, is the tension-resisting element positioned below the transverse centerline or centerplane of the belt section in the lower portion of the belt.

V-belts are designed to operate with grooved pulleys or sheaves in which the sides of the belt come into frictional contact with the surfaces of the pulley grooves for example in variable speed drives. The driving function of the belt is performed largely by the flexible resilient material under compression which is in frictional wedging engagement with the grooved pulleys of the drive. Often the compression section of the belt includes a plurality of notches or grooves in order to increase the flexibility of the belt as it travels around the pulleys.

The pitch line or neutral axis of the belt running on a pulley is considered at least in theory to be that point in the belt that has the same velocity when it passes over the pulley as the whole belt has when traveling between the pulleys. For all practical purposes in a V-belt the pitch line is considered to be located at the longitudinal centerline of the stress-resisting member or cord. However, this location may vary depending upon the particular structure of the belt. If more than one member is provided, the pitch line is considered to be the longitudinal centerline of the centermost member. Therefore, in a conventional V-belt construction the pitch line or neutral axis of the belt is located in the upper ½ of the belt or nearer to the top surface or major base than to the bottom surface or minor base.

Those skilled in the art are aware that some problems have been encountered with the use of conventional V-belts as described above. For example, when a conventional V-belt is used in conjunction with relatively small diameter sheaves or pulleys, the belt must necessarily undergo severe bending or flexing as it travels around the pulleys and conventional V-belt structures have not proven to be of sufficient flexibility to operate for satisfactory periods of time under these conditions. This is to a considerable extent due to the fact that the flexible resilient material under compression disposed below the pitch line of the belt in its thickest section must provide the frictional wedging contact with the pulley grooves. Consequently, more compact belt drive assemblies necessary to achieve higher ratio drives have heretofore not been practical.

Furthermore, with conventional V-belt structures the possibility of belt roll over due to misalignment and disengagement of the belt from the drive is more likely because of the relatively high pitch line of the belts.

It has been found unexpectedly that the before-mentioned disadvantages of the conventional V-belt are overcome, at least in applications involving relatively low horsepower requirements, by the belt structure of the present invention which will be hereinafter fully described.

OBJECTS OF THE INVENTION

It is a primary object of the present invention to provide a V-belt structure of high longitudinal flexibility particularly for use in compact high ratio drives equipped with relatively small diameter pulleys.

It is another important object of the present invention to provide a V-belt with improved service life and operability for use in variable speed drives.

It is another object of this invention to provide a V-belt having a lower pitch line in which the driving action is accomplished by means of flexible resilient material under tension rather than by means of flexible resilient material under compression.

Other objects and advantages of this invention will become apparent hereinafter as the description thereof proceeds, the novel features, arrangements and combinations being clearly pointed out in the specification as well as the claims thereunto appended.

It has been found in accordance with the teachings of the present invention that the beforementioned objects can be accomplished by providing a power transmission belt having a body of a generally trapezoidal cross-sectional configuration which includes a first surface extending longitudinally of the belt; a second surface spaced from the first surface on the opposite side of the belt therefrom with the first surface having a greater width than the second surface; a tension section adjacent to the first surface having a plurality of grooves therein extending generally transversely of the belt and penetrating for at least a substantial depth from the first surface into the tension section; a compression section adjacent to the second surface with the tension section having a greater thickness than the compression section; and a neutral axis section disposed between the tension and compression sections with all the sections being formed into an integral composite structure.

In the preferred belt construction, the neutral axis section includes at least one tension stress-resisting member extending generally longitudinally of the belt with the vertical distance between the first surface and the transverse centerplane of the member being greater than the vertical distance between the second surface and the transverse centerplane of the member. Preferably the depth of each groove is from about ¼ to about ½ of the height or thickness of the belt and the thickness of the compression section is at least ¼ of the height or thickness of the belt.

The objects and advantages of the invention are also accomplished by a V-belt structure having the improvement wherein the major base includes a plurality of notches therein extending generally transversely of the belt and penetrating for a substantial depth into the belt and the vertical distance between the pitch line of the belt and the major base is greater than the vertical distance between the longitudinal centerplane of the belt section and the major base. Preferably, in the latter mentioned belt structure the vertical distance between the major base and the bottom of the notches is no greater than ½ nor less than ¼ of the vertical distance between the major base and the minor base and the vertical distance between the major base and the pitch line is greater than ½ but less than ¾ of the vertical distance between the major base and the minor base.

BRIEF DESCRIPTION OF THE DRAWINGS

In the drawings:

FIG. 1 is a fragmentary plan view of a belt drive assembly including the transmission belt of the present invention shown in its operating position around the pulleys of the drive;

FIG. 2 is a fragmentary side elevational view of the invention shown in FIG. 1;

FIG. 3 is an enlarged sectional view taken on line 3—3 of FIG. 1;

DESCRIPTION OF THE PREFERRED EMBODIMENTS

Figure 4:
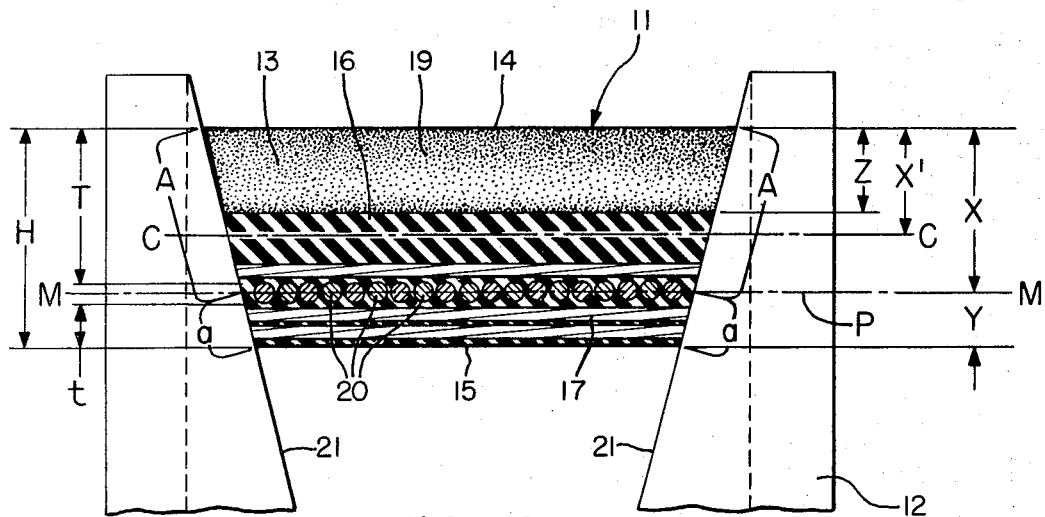
FIG. 4 is an enlarged sectional view taken on line 4—4 of FIG. 2.

Referring now to the drawings, in FIGS. 1 through 4 a part of the belt drive assembly 10, for example, of the variable speed type, is shown including a flexible transmission belt 11 which is trained around rigid metallic sheaves or pulleys 12. As shown in FIG. 2, the pitch line or neutral axis P of the belt is disposed below the longitudinal centerline or centerplane C—C of the belt.

The specific features of the belt 11 are best seen in FIGS. 3 and 4. As illustrated, the belt 11 is of a reinforced unitary construction and includes a body 13 of flexible resilient material. This is perferably a flexible polymetric material such as natural or synthetic rubber or other elastomeric materials.

The body 13 has a generally trapezoidal cross-section which includes a surface 14 at the top or major base portion of the belt 11 and another surface 15 spaced from the surface 14 at the bottom or minor base portion of the belt. It is to be understood that the use of the terms "top" and "bottom" here is relative depending upon the point of reference. The belt 11 also includes a tension section 16 adjacent to the top surface or major base 14, a compression section 17 adjacent to the bottom surface or minor base 15 and a neutral axis section 18 disposed between the tension and compression sections. The tension section 16, contrary to conventional V-belt manufacturing practice, has a greater thickness or height T than the thickness or height t of the compression section 17. Thereby, the neutral axis section 18 of the belt is disposed below the longitudinal centerplane C—C of the belt which is also a departure from conventional V-belt construction techniques. The thickness t of the compression section 17 should be at least ¼ of the height or total thickness H of the belt in order to achieve a balance between operating characteristics. That is to say the neutral axis or pitch line P of the belt should be disposed no lower than ¾ of the height H of the belt to provide for sufficient power while still achieving a high degree of flexibility.

In order to provide for increased flexibility, the tension section 16 includes a plurality of grooves or notches 19 which, for example, may be ground or molded into the top surface or major base 14 of the belt 11. The grooves 19 extend generally transversely of the belt and penetrate for at least a substantial depth D from the surface 14 into the tension section 16. As best illustrated in FIG. 3, the depth D of the groove 19 may be for example ⅜ of the height H of the belt. Preferably, the depth of each groove is from about ¼ to about ½ of the height or thickness H of the belt 11 as represented in broken lines by D' and D" respectively in FIG. 3. The width w of each groove 19 may vary but for relatively wide belts intended for higher horse power requirements, the width w of the grooves should be less than the width W or linear dimension of the surface 14 between each groove 19 to provide for sufficient bridging support of the tension section 16. If desired, for added flexibility, similar grooves or notches may be provided in the compression section 17 of the belt with the depth of these latter-mentioned grooves being, of course, dependent upon the thickness of the compression section.

Preferably the neutral axis section 18 which is the load-carrying section of the belt 11 includes at least one tension stress-resisting member 20 therein extending generally longitudinally of the belt and disposed transversely thereof. For example, it is preferred that each of the tension-resisting members 20 be disposed in helical wraps across the belt 11 in the stress zone or neutral axis section 18 with each wrap of the helix positioned in spaced side-by-side relationship to form a plurality of longitudinal extending members. The tension resisting member 20 is normally in the form of a single cord which may be either of a twisted fiber or filament construction referred to as cable cord of tire cord which is composed of any of the well-known textile fabric materials, such as cotton, nylon, rayon or polyester or combinations thereof and may also be composed of such materials as steel wire or fiberglass.

Referring particularly to FIG. 4 showing a transverse section of the belt, it can be seen that the vertical distance X between the major base 14 and the horizontal or transverse centerplane M—M of the member 20 is greater than the vertical distance Y between the minor base 15 and the transverse centerplane M—M of the member 20. It is preferred that the ratio of the vertical distance H (height of the belt 11) between the major base 14 and the minor base 15 to the vertical distance Y between the minor base 15 and the transverse centerplane M—M of the member 20 is greater than 2 to 1 and no greater than 4 to 1. Accordingly, as best seen in FIG. 3 illustrating a longitudinal section of the belt, the vertical distance Z between the major base and the bottom of the grooves or notches 19 (depth of the grooves) is no greater than ½ or less than ¼ of the vertical distance H (height of the belt 11) between the major base 14 and the minor base 15. As best shown in FIG. 3, the vertical distance X between the pitch line P and the major base 14 is greater than the vertical distance X' between the horizontal centerplane C—C of the belt section and the major base 14. In a further relationship, it is preferred that the vertical distance X between the major base 14 and the pitch line P (or to a horizontal plane through the pitch line P) of the belt 11 is greater than ½ but less than ¾ of the vertical distance H between the major base 14 and the minor base 15.

It is to be understood that if more than one stress-resisting member is provided, the above distances should be measured from a transverse centerplane through the centermost member.

The pulleys have faces or surfaces which correspond generally to the cross-sectional configuration of the belt. For example, each pulley 12 includes belt contacting surfaces 21 of a substantially conical configuration which contacts the angular sidewalls of the belt 11. As can be seen in FIG. 4, since the tension section 16 has a greater thickness T than the thickness t of the compression section 17, a greater area A of the sidewalls of the tension section 16 are in wedging engagement with the surfaces 21 of the pulley grooves than are the areas a of the compression section 17. Therefore, the greatest proportion of the frictional driving contact of the belt 11 in the pulley 12 is accomplished by means of the flexible resilient polymeric material under tension than with this material under compression.

Since less material is present below the pitch line P of the belt 11 which must bend around the pulleys 12 and the grooves 19 decrease the amount of material in the enlarged tension section 16, the flexibility of the belt is greatly increased. In addition, since the belt 11 has a lowered pitch line P and, therefore, a greater stability in its operating position in the pulleys 12 there is far less likelihood of belt roll over due to misalignment in the drive.

It should be apparent that the structure of this invention allows greater flexibility as the belt moves over the pulleys and consequently results in improved service life and operability of the belt particularly in compact variable speed drives in which a relatively low horsepower attainment is required.

Of course, it is to be understood that the belts of this invention can be used with many other belt drive assemblies and consequently, many various pulley arrangements are possible. For instance, it has been found that these belts are particularly useful as part of variable speed drives for small vehicles such as garden tractors and snowmobiles.

Figure 5:
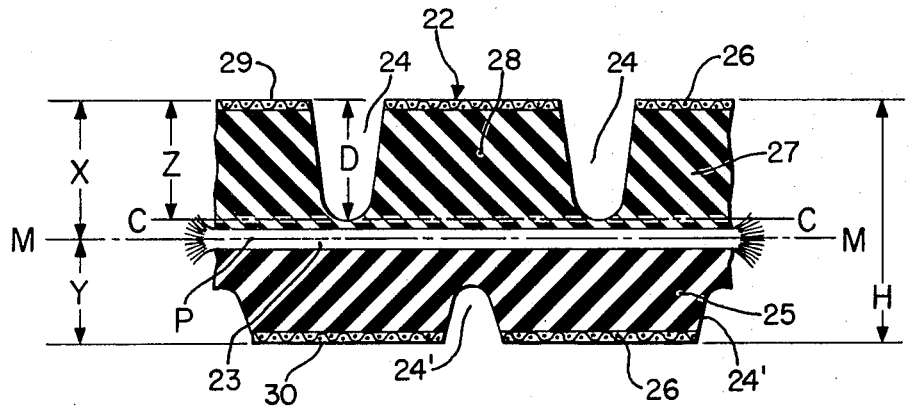
FIGS. 5 and 6 are enlarged sectional views showing a modification of the invention as shown in FIGS. 3 and 4 respectively.
Figure 6:
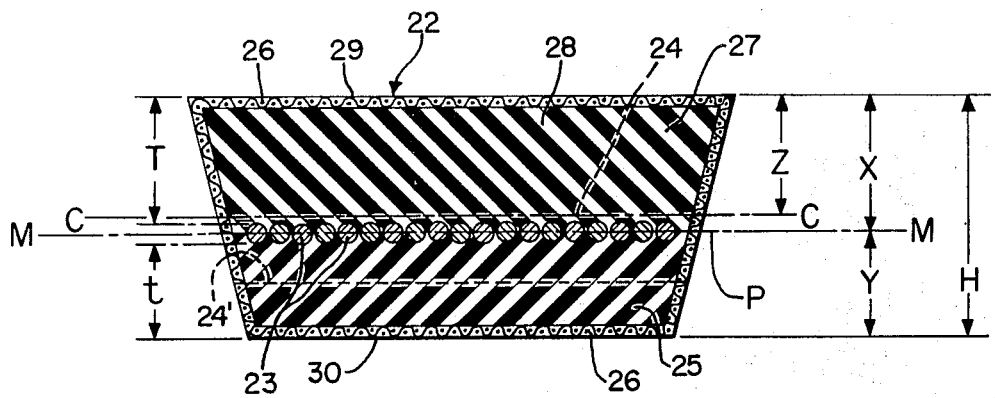

In some applications it may be desirable to balance the properties of the belt to achieve optimum flexibility with a greater stress-resisting or load-carrying capacity in order to use the belts in applications involving greater horsepower requirements. In this case, it may be desirable, for example, to position the stress-resisting member closer to the longitudinal centerline of the belt to achieve greater load-carrying capabilities. For example in the belt 22 shown in FIGS. 5 and 6, the stress-resisting cords 23 may be disposed just below the longitudinal centerplane C—C of the belt and the grooves or notches 24 may be provided to a maximum depth of ½ of the total thickness H of the belt in order to obtain both maximum flexibility and increased strength.

In this embodiment of the invention it may also be desirable, but not mandatory, to provide grooves 24' in the compression section 25 of the belt. The depth of the grooves 24' may, for example, be from about ⅛ to about ¼ of the thickness H of the belt.

In addition, the belt 22 may also include an envelope 26 of rubber impregnated textile fabric material surrounding the belt body 27 when greater horsepower requirements are involved. In this case, of course, the envelope material of the belt's tension section 28 would be in engagement with pulley grooves during the operation of the belt in a belt drive assembly to provide the greatest proportion of frictional driving contact with the pulleys. However, in this case it also follows that a greater share of the driving contact also will be carried by the compression section 25 of the belt.

In manufacturing this belt 22, the notches 24, 24' may be ground or cut into the surfaces 29, 30 of the belt after the fabric envelope 26 has been applied or if desired, the envelope may be provided as part of a molding procedure in which case the envelope material would also cover the surfaces of the notches or grooves 24, 24'.

Therefore, in regard to balancing the flexibility and load carrying properties of the belts of this invention, it can be said that the depth D of the grooves or notches should be inversely proportional to the vertical distance X between the top surface or major base of the belt and the transverse centerplane M—M of the stress-resisting member or cord or to the pitch line P of the belt. It also follows that the depth of the grooves D is directly proportional to the vertical distance Y between the minor base portion of the belt and the transverse centerplane M—M of the load carrying cords or to the pitch line P of the belt. Stated in another way, the vertical distance Z between the major base and the bottom of the notches (depth of grooves) should vary inversely with the vertical distance X between the major base and the pitch line P of the belt (or a horizontal plane through the pitch line P of the belt).

The belts of this invention are manufactured in a customary manner as for example, by assembling and vulcanizing the belt components into a unitary composite structure by means of conventional equipment well-known for these purposes.

Of course, it should be understood that many other various belt constructions are possible other than the specific embodiments shown. For instance, the belt may be of an arched construction well known in the art.

It should be apparent to those skilled in the art that this invention provides a belt structure for a V-belt of unexpectedly high flexibility but with sufficient load carrying capabilities at least for relatively low horsepower requirements which will accomplish the objects of this invention by exhibiting improved service life and operability, for example, in compact variable speed drives.

The following example further illustrates the objects and advantages of this invention.

EXAMPLE

In order to compare the flexibility and operability of the belts of the present invention with those of other V-belt constructions, several belt samples were manufactured of synthetic elastomeric material reinforced with tension stress-resisting cords. The belt samples were manufactured according to conventional building and vulcanizing techniques as previously described. The belt samples after manufacture, were dynamically tested as will be hereinafter described. The belt samples are labeled Belts A through F and the test results are presented below in Table A. All of the belts had a top width or major base of about ⅝ of an inch, a bottom width or minor base of about ⅜ of an inch and a total thickness of from about ⅜ to about 9/16 of an inch. Each belt was approximately 40 inches in overall length.

Sample Belts A were similar to the belt shown in FIGS. 3 and 4 having a generally trapezoidal cross-section. The body of each belt was composed of neoprene rubber and the tension section of each belt had a greater thickness than the compression section. The neutral axis section included reinforcing tension stress-resisting cords of polyester material disposed at a position below the longitudinal centerplane of the belt about ¾ of the distance from the major base to the minor base. The Belts A therefore had a lowered pitch line. More specifically the belt samples A each had an overall height or thickness of 0.530 of an inch and the cords were disposed at a vertical distance of 0.180 of an inch from the bottom or minor base of the belt.

Each Belt A also included a plurality of notches or grooves extending into the tension section of the belt to a depth of about 0.250 of an inch in accordance with the teachings of the present invention. In other words, the depth of the grooves was about 7/16 of the overall thickness of the belt.

Belt B was made in the same manner as Belts A and was of the same construction except that Belt B included no notches or grooves.

The belt samples identified as Belt C were several samples of a standard notched or cogged V-belt construction having a rubberized fabric envelope. These belts included a tension and compression section of neoprene rubber and had polyester cords disposed in the upper part of the cross-section of the belt according to conventional V-belt manufacturing practices. The notches were included in the compression section of the belt samples C. The depth of each notch was about 5/32 of an inch.

Belt samples D were of a conventional V-belt construction having a rubberized fabric envelope surrounding an insulation layer of neoprene rubber and a compression section composed of natural rubber. The neutral axis section included tension stress-resisting cords composed of nylon fabric disposed above the longitudinal centerplane of the belt.

Belt samples E were uncogged and of an envelope construction including steel cable reinforcement in the upper portion of the cross-section of the belt. The belts were formed of neoprene rubber.

Belt samples F were a conventional neoprene V-belt of a cut edge construction having a five ply fabric cushion or compression section composed of a combination of nylon and polyester textile fabric material. Reinforcing cords of polyester material were disposed in a conventional manner in the upper portion of the belt section, The Belts A through F were dynamically tested according to the following procedure. Each belt sample was mounted on a V-belt flex tester having a 2 pulley arrangement consisting of a drive and a driven pulley. Both the drive and driven pulley had a 3 inch outside diameter and a top width of ⅝ of an inch with an included angle 30°. The drive pulley was operated at 4,000 rpm. The tight side tension plus the slack side tension equaled 125 pounds. The belts were tested to failure and the lapsed time of the test of each belt sample to failure is shown in Table A.

TABLE A

| Belt | Time to Failure (Hours) |
| --- | --- |
| A | 1869, 1822, 41.5 (last belt sample removed due to equipment problems not because of failure) Average 1845.5 |
| B | 84.3 |
| C | 131.3, 91.5, 211.9, 140.2, 137.1, 151.3, 60, 277, 322, 322, 300, 223, 357, 405, 417, 417 Average 247.1 |
| D | 47.5, 38.1, 46.1, 52.4, 84, 84, 91, 91 Average 66.8 |
| E | 523, 654, 475, 1057 Average 677.3 |
| F | 1079, 1181, 315.9 Average 858.6 |

Belt samples A failed due to top cracks in the tension section between the grooves. These belt samples were still in one piece and in operable condition. The majority of the other belt samples B through F at the time of failure were destroyed and could not be operated further.

This above data indicate that the Belts A of the present invention exhibit a far superior resistance to failure under dynamic test than do the Belts B through F. Belt samples A of this invention were superior to both belt sample B having a lowered pitch line but including no grooves and belt samples C through F which were conventional V-belt structures of both cogged and uncogged constructions having standard pitch lines. The data therefore indicates that much more than just an accumulative effect is achieved in increasing the flexibility of a V-belt by the practice of the present invention in which the pitch line of the belt is lowered and grooves are provided to a substantial depth into the tension section of the belt.

While certain representative embodiments and details have been shown for the purpose of illustrating the invention, it will be apparent to those skilled in the art that various changes and modifications may be made therein without departing from the spirit or scope of the invention.

I claim:

1. A power transmission belt of high longitudinal flexibility having a body of a generally trapezoidal cross-sectional configuration comprising:
   A. a first non-driving surface extending longitudinally of the belt;
   B. a second non-driving surface spaced from said first surface on the opposite side of the belt therefrom with said first surface having a greater width than said second surface;
   C. a tension section adjacent to said first surface having a plurality of grooves therein extending generally transversely of the belt and penetrating for at least a substantial depth from said first surface into said tension section;

D. a compression section adjacent to said second surface with said tension section having a greater thickness than said compression section; and E. a neutral axis section disposed between said tension and compression sections, said neutral axis section comprising at least one stress-resisting member therein extending generally longitudinally of the belt, said member being spaced from the bottom of said grooves in said tension section and the vertical distance between said first surface and the transverse center plane of said member being greater than the vertical distance between said second surface and the transverse center plane of said member with all said sections being formed into an integral composite structure.

2. The belt as claimed in claim 1 wherein the depth of each said groove is from about ¼ to about ½ of the height or total thickness of the belt.

3. The belt as claimed in claim 1 wherein the thickness of said compression section is at least ¼ of the height or total thickness of the belt.

4. The belt as claimed in claim 1 wherein said compression section includes a plurality of grooves therein extending generally transversely of the belt, said grooves penetrating for a substantial depth into said compression section and terminating short of and being spaced from said stress-resisting member.

5. The belt as claimed in claim 1 wherein the ratio of the vertical distance between said first and second surfaces to the vertical distance between said second surface and the transverse centerplane of said member is greater than 2 to 1 and no greater than 4 to 1.

6. The belt as claimed in claim 5 wherein the depth of each said groove is from about ¼ to about ½ of the total thickness of the belt.

7. The belt as claimed in claim 6 wherein the depth of the grooves is inversely proportional to the vertical distance between said first surface and the transverse centerplane of said member.

8. In a flexible endless trapezoidalshaped side-driving V-belt of integral composite construction comprising a major base and a minor base, and at least one strain-resisting member disposed on the pitch line of said belt, the improvement wherein the major base includes a plurality of notches therein extending generally transversely of the belt and penetrating for a substantial depth into the belt and terminating short of and being spaced from said member with the vertical distance between the pitch line of the belt and said major base being greater than the vertical distance between the longitudinal centerplane of the belt section and said major base.

9. The belt as claimed in claim 8 wherein said minor base includes a plurality of notches therein extending generally transversely of the belt, said notches penetrating for a substantial depth into the belt and terminating short of and being spaced from said member.

10. The belt as claimed in claim 8 wherein the vertical distance between the major base and the bottom of said notches is no greater than ½ nor less than ¼ of the vertical distance between said major base and said minor base.

11. The belt as claimed in claim 8 wherein the vertical distance between said major base and said pitch line is greater than ½ but less than ¼ of the vertical distance between said major base and said minor base.

12. The belt as claimed in claim 11 wherein the vertical distance between the major base and the bottom of said notches varies inversely with the vertical distance between the major base and the pitch line of the belt.

13. In a belt drive assembly including the combination of a side-driving V-belt of flexible resilient material having a body of generally trapezoidal cross-section, a pair of grooved pulleys on which the belt is mounted, said belt comprising first and second spaced non-driving base portions with said first base portion having a greater width than said second base portion, a tension section adjacent to the first base portion and a compression section adjacent to the second base portion and a neutral axis section disposed between the tension and compression sections, said neutral axis section including a tension stress-resisting member embedded in the body of the belt, and the improvement wherein said first base portion includes a plurality of grooves therein extending transversely of the belt and penetrating for at least a substantial depth into the body and terminating short of and being spaced from said member and the vertical distance between the transverse centerplane of said member and said first base portion is greater than the vertical distance between the transverse centerplane of said member and said second base portion, thereby allowing greater flexibility as the belt moves over the pulleys.

14. The improvement as claimed in claim 13 wherein said second base incudes a plurality of grooves therein extending transversely of the belt, said grooves penetrating for a substantial depth into the belt and terminating short of and being spaced from said member.

15. The improvement as claimed in claim 13 wherein the tension section has a greater thickness than said compression section and a greater area of the sidewalls of said tension section is in wedging engagement with the pulley grooves than the area of said compression section so that the greatest proportion of the frictional driving contact of the belt in the pulley is accomplished by means of the flexible resilient material under tension than with the flexible resilient material under compression.

16. The improvement as claimed in claim 15 wherein the belt includes an envelope of rubber impregnated textile fabric material surrounding said body and the envelope is in engagement with the pulley grooves.

17. The improvement as claimed in claim 13 wherein the grooves in said first base portion have a depth varying from at least ¼ to no greater than ½ of the total thickness of the belt and wherein the vertical distance between said second base portion and the transverse centerplane of said member is less than ½ but at least ¼ of the total thickness of the belt.

18. The improvement as claimed in claim 17 wherein the depth of said grooves is directly proportional to the vertical distance between said second base portion and the transverse centerplane of said member.

* * * * *

PO-1050
(5/69)

UNITED STATES PATENT OFFICE
CERTIFICATE OF CORRECTION

Patent No. 3,830,113  Dated August 20, 1974

Inventor(s) James A Bruns

It is certified that error appears in the above-identified patent and that said Letters Patent are hereby corrected as shown below:

Column 10, line 3, "1/4" should read --3/4--.

Signed and sealed this 19th day of November 1974.

(SEAL)
Attest:

McCOY M. GIBSON JR.
Attesting Officer

C. MARSHALL DANN
Commissioner of Patents